May 13, 1941.  C. O. BLAISDELL ET AL  2,241,761
ELECTRICAL COIL AND A METHOD OF MAKING THE SAME
Filed Feb. 11, 1939

INVENTOR
C. O. BLAISDELL
F. MARTINDELL
BY Emery Robinson
ATTORNEY

Patented May 13, 1941

2,241,761

UNITED STATES PATENT OFFICE 2,241,761

ELECTRICAL COIL AND A METHOD OF MAKING THE SAME

Charles O. Blaisdell, Oak Park, and Frank Martindell, Western Springs, Ill., assignors to Western Electric Company, Incorporated, New York, N. Y., a corporation of New York Application February 11, 1939, Serial No. 255,888

6 Claims. (Cl. 175—21)

This invention relates to electrical coils and a method of making the same, and more particularly to electrical coils comprising a plurality of layers of wire interleaved with sheets of cellulose acetate material.

Electrical coils of the above type are usually wound in multiple, i. e., a plurality of such coils are wound simultaneously in separated zones upon a winding spindle. The wire is wound in layers superimposed one upon the other, and one or more sheets of cellulose acetate material are interposed between adjacent layers for supporting them and insulating them from each other. In the winding of coils of this type, the cellulose acetate interleaving sheets are usually of sufficient length to make one or more complete wrappings around each coil and of sufficient width to extending over all of the coils on the spindle. After the required number of layers of wire have been wound, the "stick" of coils is removed from the winding spindle and is then separated into individual coils by severing the cellulose acetate interleaving sheets between the spaced coils. The individual coils thus produced have no end flanges and the superimposed layers of wire are held in place only by the interleaving cellulose acetate sheets which project slightly beyond the ends of the several layers of wire. In same instances, the coils are mounted on cores having end flanges which are pressed against opposite ends of the coil, thus holding the windings in place. In such cases, the inner and outer ends of the wire are usually anchored to the end flanges so that accidental unwinding or pulling-out of the first and last convolutions or turns of wire is prevented.

It has been found desirable and/or economical, in some instances, to dispense with the core flanges and connect the inner and outer ends of the coils directly to the terminals of the associated electrical apparatus. In connection with this practice, considerable difficulty has been encountered heretofore in preventing the accidental unwinding or pulling-out of more wire than is required for leads to make the external connections, and in insuring that the leads emerge from the coil at the proper points to facilitate assembling and connecting the coil with the associated apparatus.

Objects of the present invention are to provide improved electrical coils of the type referred to which obviate the above mentioned difficulties, and to provide a simple and inexpensive method of manufacturing such coils.

In accordance with the above objects, one embodiment of the invention contemplates the provision of an electrical coil and a method of manufacturing the same, in which a plurality of layers of wire are separated from each other by interleaving sheets of cellulose acetate material which project beyond the ends of the layers of wire. The inner and outer ends of the wire are withdrawn from between the projecting portions of the interleaving sheets to provide leads for making electrical connections with the coil. The projecting portions of the cellulose acetate interleaving sheets are coalesced or integrally united adjacent the points where the leads emerge from the coil, whereby the leads are securely anchored in the coil and accidental displacement or withdrawal of the adjacent convolutions of the winding is prevented.

A more complete understanding of the invention may be had by reference to the following detailed description taken in conjunction with the accompanying drawing, in which Fig. 1 is an enlarged perspective view of a completed electrical coil embodying the invention;

Figure 1:
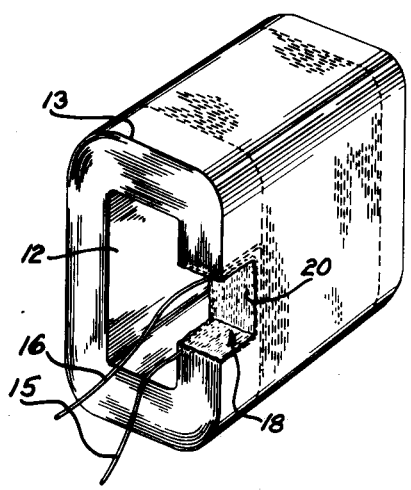

As shown in the drawing, an electrical coil embodying the invention may be initially formed in the usual manner by winding an electrical conductor, such as enamel insulated copper wire, into a plurality of layers 10 of convolutions with interleaving sheets 11 of cellulose acetate material interposed between the layers. Also, the coil may be provided, as usual, with a tubular lining 12 and a cover 13, each of which may comprise one or more layers of cellulose acetate sheet material.

Figure 3:
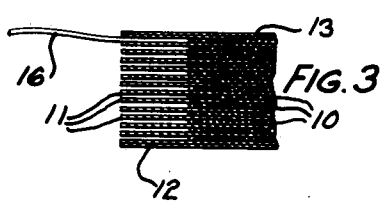
Fig. 3 is a fragmentary sectional view taken on line 3—3 of Fig. 2.
Figure 5:
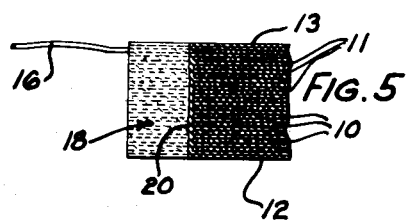
Fig. 5 is a fragmentary sectional view taken on line 5—5 of Fig. 4.

In winding electrical coils of the above type, in accordance with this invention, the cellulose acetate sheets employed are of sufficient width to project beyond the ends of the layers of wire. This is clearly indicated in Fig. 3, wherein the alternate layers of wire and cellulose acetate sheets are shown in section, and it will be seen that the inner lining 12 and cover 13, as well as the interleaving sheets 11, project well beyond the left end convolutions of the several layers of wire.

Electrical coils of this type are preferably wound in multiple, i. e., a plurality of such coils are wound simultaneously in separated zones upon a long mandrel, the cellulose acetate sheets being of sufficient width to extend over all of the coils. After the winding operation has been completed, the "stick" of coils is removed from the mandrel and is then separated into individual coils by severing the cellulose acetate sheets between the spaced coils.

To complete the manufacture of the individual coils in accordance with the present invention, the inner and outer ends of the wire are withdrawn from between the cellulose acetate sheets to provide inner and outer leads for making external connections. The required lengths of the leads will, of course, determine the amount of wire that is withdrawn from either end of the winding. The inner ends of the leads are then securely anchored within the coil by coalescing or integrally uniting the projecting end portions of the several cellulose acetate sheets through which the leads emerge from the coil.

Figure 2:
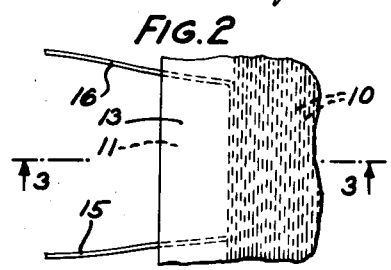
Fig. 2 is an enlarged fragmentary elevational view of such a coil before its completion, showing the leads pulled out but not anchored in the coil.

In a preferred embodiment of the invention, the inner and outer ends of the winding are first partially drawn out, as shown in Fig. 2, to provide inner and outer leads 15 and 16, respectively. A notch 18 (Figs. 1 and 4) is then coalesced in the projecting end portions of the cellulose acetate sheets between the points at which the leads are required to emerge from the coil. This is accomplished by pressing the edges of the cellulose acetate sheets against a heated tool or iron, preferably a soldering iron having a special tip, a portion of which is indicated by the broken lines 19 in Fig. 4. The iron is heated to a temperature sufficient to melt the notch in the edges of the cellulose acetate sheets and simultaneously cause the notched edges of the sheets to coalesce and become integrally united or cemented together, thus forming a wall or barrier 20. The leads are then drawn out farther until they stop against this barrier, which anchors the leads in position and prevents further withdrawal or unwinding of the wire from the inner and outer ends of the coil winding. The coalesced barrier also definitely determines the points from which the leads emerge from the coil.

Figure 4:
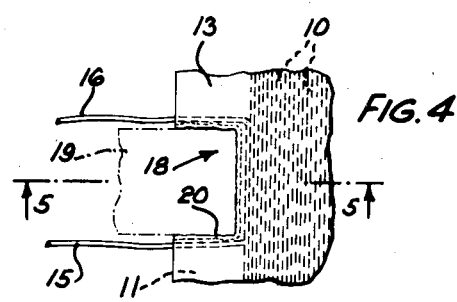
Fig. 4 is a view similar to Fig. 2, but showing the leads anchored in the coil in accordance with this invention.
Figure 6:
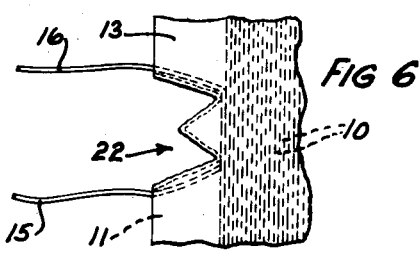
Fig. 6 is a view similar to Fig. 4, illustrating an alternative form of the invention.

The coalesced notch may be U-shaped or three-sided, as shown in Fig. 4, but if more coalesced surface is desired without increasing the space between the two leads, multiple notches or a W-shaped notch, such as shown at 22 in Fig. 6, may be employed.

It should be understood that the invention is not limited to the particular embodiments thereof herein illustrated and described, except insofar as is defined in the appended claims.

What is claimed is:

1. An electrical coil comprising a plurality of layers of convolutions of an electrical conductor separated from each other by sheets of interleaving material, said sheets having portions projecting beyond that end of said layers from which the inner and outer ends of the conductor emerge to provide leads for external connections, said projecting portions of interleaving sheets being mutually spaced throughout most of their extent and integrally united, only adjacent the points where the leads are required to emerge from the coil whereby the leads are securely anchored in the coil at said points.

2. An electrical coil comprising a plurality of layers of wire separated from each other by interleaving sheets of cellulose acetate material, said sheets having portions projecting beyond that end of said layers from which the inner and outer ends of the wire emerge to provide leads for external connections, said projecting portions of the cellulose acetate sheets being mutually spaced throughout most of their extent and coalesced together only between the points where the leads emerge from the coil, whereby the leads are anchored in the coil at said points.

3. An electrical coil comprising a plurality of layers of wire separated from each other by interleaving sheets of cellulose acetate material, said sheets having portions projecting beyond that end of said layers from which the inner and outer ends of the wire emerge to provide leads for external connections, said projecting portions of the cellulose acetate sheets being mutually spaced throughout most of their extent and having a notch coalesced therein between the points where the leads emerge from the coil, whereby the leads are anchored in the coil at said points.

4. An electrical coil comprising a plurality of layers of wire separated from each other by interleaving sheets of cellulose acetate material, said sheets having portions projecting beyond that end of said layers from which the inner and outer ends of the wire emerge to provide leads for external connections, said projecting portions of the cellulose acetate sheets being mutually spaced throughout most of their extent and having U-shaped notches formed therein between the points where the leads emerge from the coil, and the corresponding edges of said notches being coalesced together, whereby the leads are anchored in the coil at said points.

5. A method of making an electrical coil, which comprises winding a plurality of layers of convolutions of an electrical conductor, separating said layers from each other by inserting therebetween sheets of interleaving material of sufficient width to project beyond one end of said layers, withdrawing an end of said conductor from between the projecting end portions of adjacent interleaving sheets to provide a lead for an external connection, integrally uniting the projecting end portions of said interleaving sheets only adjacent the point where the lead is required to emerge from the coil, thus providing a barrier for preventing withdrawal of the said conductor end beyond the said point, and withdrawing the conductor end up to said barrier.

6. A method of making an electrical coil, which comprises winding a plurality of layers of convolutions of wire, separating said layers from each other by inserting therebetween sheets of cellulose acetate material of sufficient width to project beyond one end of said layers, withdrawing the inner and outer ends of the wire from between the projecting end portions of said sheets to provide leads for external connections, coalescing said projecting end portions only between the points where the leads are required to emerge from the coil, thus providing a barrier for preventing withdrawal of the wire ends beyond said points, and withdrawing the wire ends up to said barrier.

CHARLES O. BLAISDELL.
FRANK MARTINDELL.